United States Patent [19]

Reinsch

[11] Patent Number: 5,565,933
[45] Date of Patent: Oct. 15, 1996

[54] COLOR SWITCHING APPARATUS FOR LIQUID CRYSTAL LIGHT VALVE PROJECTOR

[75] Inventor: Stephen J. Reinsch, Vista, Calif.

[73] Assignee: Hughes-JVC Technology Corporation, Carlsbad, Calif.

[21] Appl. No.: 894,964

[22] Filed: Jun. 8, 1992

[51] Int. Cl.$^6$ .............................. H04N 9/31; H04N 5/74
[52] U.S. Cl. .......................... 348/742; 348/758; 348/744; 353/31; 359/68
[58] Field of Search ............................... 358/61, 60, 232, 358/231, 64, 66; 359/63, 68, 40, 64, 496; 353/31, 33, 20, 122; 348/742, 739, 744, 751, 752, 757, 758, 762, 761, 767, 776, 777, 781, 791; H04N 9/31, 5/74

[56] References Cited

U.S. PATENT DOCUMENTS

| | | | |
|---|---|---|---|
| 2,715,153 | 8/1955 | Sziklai | 358/61 |
| 3,781,465 | 12/1973 | Ernstoft et al. | 358/61 |
| 4,191,456 | 3/1980 | Hong et al. | 358/61 |
| 4,582,396 | 4/1986 | Bos et al. | 358/61 |
| 4,786,146 | 11/1988 | Ledebuhr | 359/63 |
| 4,842,374 | 6/1989 | Ledebuhr | 359/68 |
| 5,032,007 | 7/1991 | Silverstein et al. | 359/68 |
| 5,172,221 | 12/1992 | Ko | 358/61 |
| 5,200,844 | 4/1993 | Suvada | 348/761 |

OTHER PUBLICATIONS

Haven, Thomas J.; "Reinventing The Color Wheel," *Information Display*, Jan. 1991; pp. 11–15.
Bleha, W. P.; "Progress In Liquid Crystal Light Valves," *Laser Focus/Electro-Optics*, Oct. 1983; pp. 111–120.

Primary Examiner—Safet Metjahic
Attorney, Agent, or Firm—Harness, Dickey & Pierce, P.L.C.

[57] ABSTRACT

A liquid crystal light valve (12) is sequentially modulated with images corresponding to three primary color components of a scene at a rate which is faster than flicker can be perceived. A color switching apparatus (20) receives a white light beam from a high intensity light source (18), separates the white light beam into three color light beams of the respective primary colors, and sequentially illuminates the light valve (12) with the three color light beams in synchronism with modulation of the light valve (12) with the corresponding color image components. An optical system (26) projects an image of the modulated light valve surface on a screen (28), such that the three color component images appear to merge together in time and thereby synthesize a full color image of the scene. The switching apparatus (20) includes a polarizing beam splitter (30), three dichroic reflectors (34,36,46) which separate the white light beam into the three color light beams, and electrically switchable polarization rotators (38,40,48). The rotators (36,40,48), in combination with the beam splitter (30), control the polarizations of the color light beams such that only a selected one of the beams is directed to an output with a predetermined polarization suitable for illumination of the light valve (12), and the other two colors are effectively switched off.

40 Claims, 3 Drawing Sheets

COLOR SWITCHING APPARATUS FOR LIQUID CRYSTAL LIGHT VALVE PROJECTOR

BACKGROUND OF THE INVENTION

1. Field of the Invention

The present invention generally relates to optical imaging systems, and more specifically to a color switching apparatus for sequentially illuminating a liquid crystal light valve in an optical projector with light beams of three primary colors.

2. Description of the Related Art

An article entitled "Reinventing the color wheel", by T. Haven, appearing in Information Display, January 1991, pp. 11–15, describes the recent history of "field-sequential-color" optical imaging systems. The basic principle is to sequentially produce three monochrome images corresponding to three primary color components or fields of a scene, and switch three primary color filters into the image path in synchronism with the three monochrome images respectively. If this is performed at a fast enough rate, the color components will be averaged and appear to merge over time to synthesize a color image of the scene without apparent flicker.

In the early systems, a color wheel including red, green and blue filters was rotated by an electric motor in front of a monochrome television screen in synchronism with electronic switching of the monochrome color component fields applied to the screen. Although operable, this approach suffered from the drawbacks of excessive mechanical system size, technical deficiencies including difficulty of synchronization, and incompatibility with monochrome television system standards.

The improved arrangement described in the referenced article replaces the rotary color wheel with a color filter switching device including color and monochrome polarizers and liquid crystal or "pi" ($\pi$) cells which are electrically switchable to provide either 90° (half-wavelength) polarization rotation, or no polarization rotation. The monochrome image fields are applied to a cathode ray tube (CRT) having a white phosphor.

The color polarizers separate the white phosphor from the CRT into red, green and blue color components having different polarizations. The pi cells are switched such that the selected color component is allowed to pass through the device, but the unwanted color components are rotated to a polarization state which is blocked by the monochrome polarizer.

A major drawback of this arrangement is that only about 6.5% of the light from the CRT is transmitted through the switching device. This is extremely inefficient, and requires a CRT with inordinately high luminance to produce an acceptably bright image. The sheet polarizers are also highly absorptive, and cannot be used with a high intensity light beam.

The liquid crystal light valve (LCLV) is an optical-to-optical image transducer that is capable of accepting a low-intensity visible light image and converting it, in real time, into an output image with light from another source. A general description of the applications of LCLV technology is presented in a paper entitled "Progress in Liquid Crystal Light Valves", by W. P. Bleha, Laser Focus/Electro-Optics, October 1983, pp 111–120.

The LCLV is widely used as an element in optical projectors. In such a system, the LCLV is optically modulated with an image from a CRT to provide a reflectance pattern on a surface thereof corresponding to the image. The surface is illuminated with white light from a high intensity source, and an image of the illuminated surface pattern is projected onto a screen by an optical system.

LCLV projectors are capable of providing large, high intensity monochrome images with excellent resolution. However, to make a color projector using prior art technology, it would be necessary to provide three monochrome projectors with color filters and an arrangement for accurately registering the color images from the monochrome projectors. This would be too large and expensive for practical use.

SUMMARY OF THE INVENTION

In a LCLV projector embodying the present invention, a LCLV is sequentially modulated with images corresponding to three primary color components of a scene at a rate which is faster than flicker can be perceived. A color switching apparatus receives a white light beam from a high intensity light source, separates the white light beam into three color light beams of the respective primary colors, and sequentially illuminates the light valve with the three color light beams in synchronism with modulation of the light valve with the corresponding color image components. An optical system projects an image of the modulated light valve surface on a screen, such that the three color component images appear to merge in time and thereby synthesize a full color image of the scene.

The switching apparatus for the LCLV projector includes a polarizing beam splitter, three dichroic reflectors which separate the white light beam into the three color light beams, and electrically switchable polarization rotators. The rotators, in combination with the beam splitter, control the polarizations of the color light beams such that only a selected one of the beams is directed to an output with a predetermined polarization suitable for illumination of the light valve, and the other two colors are effectively switched off.

A reflector and rotator set is provided for each color. The apparatus may accomplish color switching using only one polarization, with the reflectors and rotators linearly aligned with each other to receive a single beam of light from the beam splitter with either parallel or perpendicular polarization. Alternatively, the apparatus may use two orthogonal polarizations. In this case, the reflector and rotator for one or two of the colors are disposed to receive a beam of light which passes through the beam splitter with parallel polarization, and the reflector and rotator for the other one or two of the colors are disposed to receive a beam of light which is reflected from the beam splitter with perpendicular polarization. In another embodiment of the apparatus, the beam splitter is replaced by three additional reflectors, one for each color.

The color switching apparatus can be used in applications other than LCLV projectors, and may be suitably modified. For example, the apparatus can be designed to switch two, rather than three colors, or more than three colors. Two or more colors can be switched in simultaneously. In addition, the rotators may be formed as segments which extend perpendicular to the direction of propagation of light therethrough, and are individually switchable in sequence to provide a moving window effect.

The present invention eliminates the drawbacks of the prior art color wheel and color filter switch and enables a small and compact LCLV projector to be provided with full color capability. The present system enables the variation of synchronization, duty cycle and other parameters which is not practical with a mechanical color wheel. As a further advantage of the invention, the present color switching apparatus does not absorb a large proportion of the image light as does the prior art color filter switching device.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
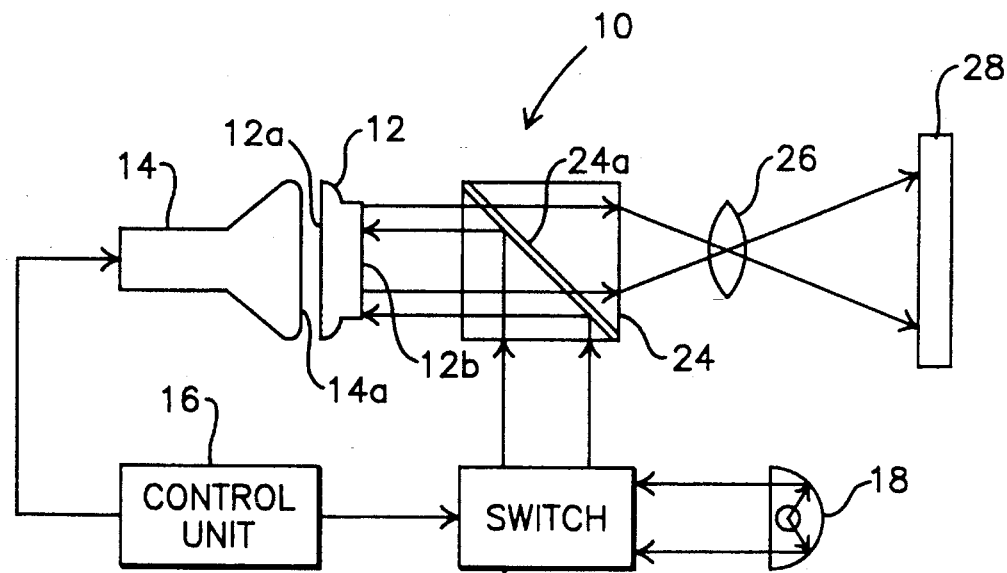
FIG. 1 is a simplified schematic diagram of a liquid crystal light valve (LCLV) color projector embodying the present invention.

As illustrated in FIG. 1, a color projector embodying the present invention is generally designated as 10, and includes a liquid crystal light valve (LCLV) 12. Electrical signals corresponding to three primary color components or fields of an image of a scene for projection are sequentially applied to and displayed on a screen 14a of a cathode ray tube (CRT) 14 by a control unit 16. The primary colors are preferably red, green and blue, although the complementary primary colors cyan, magenta and yellow or other colors may be used. The sequence of the red, green and blue fields is repeatedly applied to the CRT 14 at a high enough rate that the image on the screen 14a will not appear to flicker.

The CRT image is used to optically modulate a left surface 12a of the LCLV 12 such that a reflectance pattern corresponding to the CRT image appears on a right surface 12b thereof. A high intensity light source 18 such as a xenon or metal halide arc lamp produces a collimated white input light beam which is directed through a color switching apparatus 20 embodying the present invention. The apparatus 20 produces an output light beam of a primary color corresponding to the field signal applied to the CRT 14 under control of the unit 16. The color light beam is reflected leftwardly from a reflecting surface 24a of a polarizing beam splitter cube 24 onto the right surface 12b of the LCLV 12. The light paths in FIG. 1 are illustrated by arrows, although not designated by reference numerals.

The cube 24 has the properties such that unpolarized light incident thereon is split into two beam portions. A first portion passes straight through the cube 24 and is polarized with a parallel "P" or π linear polarization state, whereas a second portion is reflected from the surface 24a and polarized with a perpendicular ("senkrecht" in German) "S" or σ linear polarization state. If S polarized light is incident on the cube 24, it will be reflected from the surface 24a, whereas if P polarized light is incident on the cube 24, it will pass straight through. The color switching apparatus 20 is constructed such that the color light beam output therefrom has S polarization, and is reflected from the surface 24a to the LCLV 12.

The light from the cube 24 is reflected rightwardly from the right surface 12b of the LCLV 12 in the form of a light image corresponding to the reflectance pattern thereon back to the cube 24. Although not shown in detail, the right surface 12b of the LCLV 12 includes a polarization rotation layer such that the light image reflected back to the cube 24 has its polarization rotated by 90° to the P polarization state. The reflected light image passes rightwardly through the cube 24, and is focussed by a lens 26 onto a projection screen 28 with high magnification to provide a full color image of the scene. The three color images are switched sequentially at a speed which is high enough that they appear to merge together in time without flicker as perceived by the eye.

It will be understood that the word "color" in the present context refers to a particular optical wavelength range. The color switching apparatus 20 can be used in applications other than the projector 10, and may be used to switch optical wavelength ranges or "colors" in the infrared and ultraviolet spectral regions as well as red, green, blue or other colors in the visible region.

Figure 2:
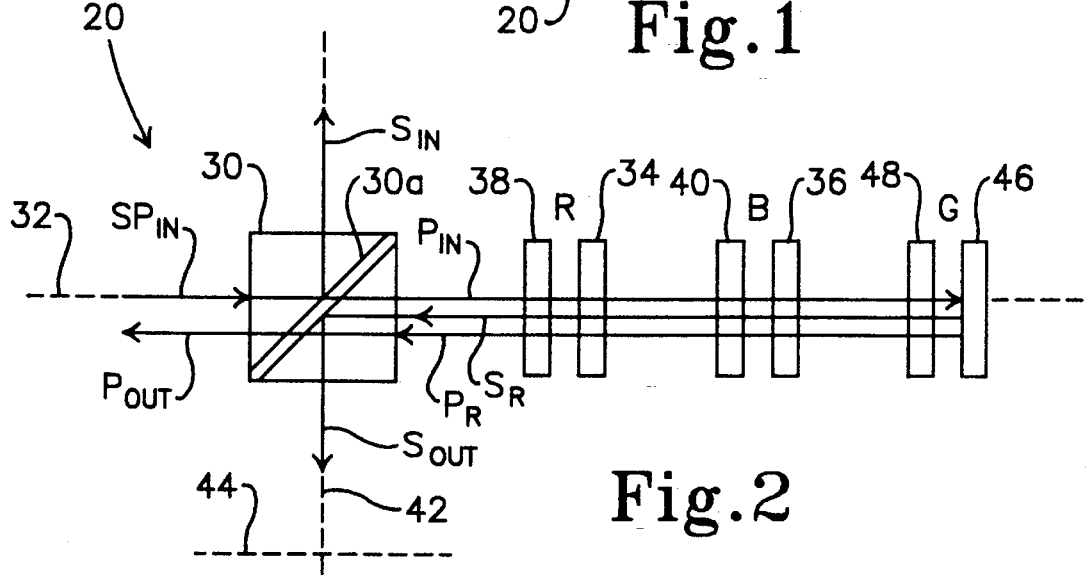
FIGS. 2 to 6 are simplified schematic diagrams illustrating alternative basic embodiments of a color switching apparatus of the invention for use in the projector.

The color switching apparatus 20 may be embodied in several ways, as illustrated in FIGS. 2 to 6. As shown in FIG. 2, the color switching apparatus 20 is designed to use only the P polarization of input light from the source 18, although the input light beam, designated as $SP_{IN}$, is assumed to be initially unpolarized. The apparatus 20 includes a polarizing beam splitter cube 30 which is essentially similar to the cube 24 and has a reflecting surface 30a. It will be understood, however, that the cube 30 may be replaced by any other type of polarizing beam splitter which provides an equivalent function. The input light beam $SP_{IN}$ is incident on the surface 30a rightwardly along an input axis 32, and is split into two beam portions; a P polarized beam $P_{IN}$ which passes rightwardly straight through the cube 30, and an S polarized beam $S_{IN}$ which is reflected upwardly from the surface 30a out of the cube 30.

The beam $S_{IN}$ is not used by the apparatus 20. If desired, a linear polarizer (not shown) may be provided to pass only the P polarization of the input light beam $SP_{IN}$ to the cube 30. A more desirable alternative is to provide a beam combiner (not shown), which passes the P polarization and converts the S polarization to P polarization, thereby preventing the S polarized light from being wasted.

In its most basic form, the apparatus 20 is designed to switch two colors, as will be described first to explain the principles of the invention. A dichroic or other type of reflector 34 which reflects red (R) light and transmits blue (B) and green (G) light is disposed rightwardly of the cube 30 along the input axis 32. A similar reflector 36 which reflects blue light, does not reflect red light and transmits green light is disposed rightwardly of the reflector 34 along the axis 32.

A switchable liquid crystal quarter-wave polarization rotator 38, also known in the art as a liquid crystal retarder or switch, is disposed between the reflector 34 and the cube 30. With no electrical voltage applied to the rotator 38, it will pass light therethrough without alteration. With a suitable electrical voltage applied thereto (from the control unit 16), the rotator 38 will convert the light passing therethrough from linear to circular polarization. Conversely, the rotator 38 will convert circularly polarized light to linear polarization.

More specifically, the rotator 38 will convert P linearly polarized light to right-hand circular polarization, and S linearly polarized light to left-hand circular polarization. It will also convert right-hand circularly polarized light to P linear polarization, and left-hand circularly polarized light to S linear polarization. Rotators or retarders of this type are commercially available as off-the-shelf components from, for example, Meadowlark Optics of Longmont, Colo.

Assuming that an electrical voltage is applied to the rotator 38, the P polarized portion $P_{IN}$ of the input light beam $SP_{IN}$ will pass rightwardly through the cube 30 and rotator 38 to the reflector 34. The red component of the light $P_{IN}$ will be reflected leftwardly by the reflector 34 through the rotator 38 to the cube 30, whereas the blue and green components of the light $P_{IN}$ will pass rightwardly through the reflector 34.

During the rightward pass through the rotator 38, the P linearly polarized light $P_{IN}$ is converted to right-hand circular polarization. During the leftward pass through the rotator 38 after reflection from the reflector 34, the red light component is converted from right-hand circular polarization to S linear polarization and designated as a color light beam $S_R$. The beam $S_R$ is reflected downwardly by the surface 30a out of the cube 30 along an output axis 42 to an output indicated at 44 to constitute an output light beam $S_{OUT}$ for illumination of the LCLV 12.

One round-trip pass (two single passes) of a light beam through the rotator 38 produces a polarization rotation of 90°, or one-half wavelength. Thus, one single pass of the light beam through the rotator 38 produces the equivalent of a polarization rotation of 45°, or one-quarter wavelength. For this reason, the rotator 38 is considered to be switchable between a first state which produces quarter-wavelength polarization rotation and a second state which produces zero polarization. Although the rotator 38 has been described as being embodied by a commercially available device which utilizes circular polarization rotation as described above, it may be replaced by a device which produces one quarter-wavelength linear polarization rotation per single pass therethrough.

As described above, switching ON the rotator 38 causes the red light component reflected from the reflector 34 to be rotated by 90° from P to S polarization during a round-trip pass therethrough, and be reflected by the surface 30a to the output 44. Only light of S polarization is reflected by the surface 24a of the cube 24 to the LCLV 12, and any P polarized light is unused. This operation is equivalent to switching ON the red color. The red color may be switched OFF by removing the voltage from the rotator 38. In this case, the P polarized input light beam $P_{IN}$ is not rotated by the rotator 38, and the red component thereof is reflected by the reflector 38 back to the cube 30 as P polarized light which is designated as $P_R$. The light $P_R$ passes leftwardly out of the cube 30 along the input axis 32 as indicated at $P_{OUT}$, and is unused.

The rotator 40 for the blue color may be designed to provide constant quarter-wave polarization rotation. In this case, the blue color is switched ON when the red color is switched OFF. More specifically, the rotator 38 is switched OFF, and the P polarized red color beam is reflected leftwardly out through the cube 30 as the unused light beam $P_{OUT}$. The blue color beam reflected from the reflector 36 is rotated from P to S polarization by a round-trip pass through the rotator 40, and is reflected downwardly from the cube 30 to the output 44 as the output light beam $S_{OUT}$.

The blue color is switched OFF when the rotator 38 is switched ON. In this case, the S polarized red color beam is reflected to the output as $S_{OUT}$ as described above. The blue color beam reflected from the reflector 36 is rotated 90° by a round-trip pass through the rotator 34 and an additional 90° by a round-trip pass through the rotator 36 for a total of 180°. Thus, the reflected blue color beam has P polarization at the cube 30, and passes therethrough leftwardly as the unused beam $P_{OUT}$.

If the rotator 40 is made switchable in the same manner as the rotator 38 rather than providing constant quarter-wavelength polarization rotation, the apparatus 20 is capable of producing the output light beam $S_{OUT}$ as selectively including only red, only blue, both red and blue or no light. For only red, both rotators 38 and 40 are switched ON. For only blue, the rotator 38 is switched OFF and the rotator 40 is switched ON. For both red and blue, the rotator 38 is switched ON and the rotator 40 is switched OFF. In the case of both red and blue, the reflected blue light will be rotated from P to S polarization by the rotator 38. For no light output, both rotators 38 and 40 are switched OFF, no polarization rotation occurs, and both the reflected red and blue light retain their P polarization and pass leftwardly out of the apparatus through the cube 30.

In summary, an even number (including zero) of round-trip passes through the polarization rotators 38 and 40 will produce zero or equivalently 180° of polarization rotation, and switch the respective color OFF. An odd number of round-trip passes will produce 90° or equivalently 90°+ n(180°) of polarization rotation, where n is an integer including zero, and switch the respective color ON. This principle can be applied to enable the apparatus 20 switch three or more colors.

As illustrated in FIG. 2, the apparatus 20 further includes a third reflector 46 which reflects green light and does not reflect red and blue light. A polarization rotator 48 is disposed between the reflectors 36 and 46. The rotators 38, 40 and 48 are all switchable between quarter-wave (45°) and zero polarization rotation. The apparatus 20 including the reflector 46 and rotator 48 as illustrated in FIG. 2 operates using the above described principles in accordance with the following truth TABLE 1.

TABLE 1

| COLOR | ROTATOR | | |
|---|---|---|---|
| | 38 | 40 | 48 |
| R | ON | ON | OFF |
| B | OFF | ON | ON |
| G | OFF | OFF | ON |
| ALL OFF | OFF | OFF | OFF |
| ALL ON | ON | OFF | OFF |
| R + B | ON | OFF | ON |
| R + G | ON | ON | ON |
| B + G | OFF | ON | OFF |

The apparatus 20 is designed to produce the output light beam $S_{OUT}$ including a selected color or combination thereof with S linear polarization. In various applications, it is desirable to produce the output light beam as having P, rather than S polarization. This can be accomplished by providing a half-wave polarization rotator (not shown) to rotate the polarization of the output beam $S_{OUT}$ of the apparatus 20 from S to P polarization. However, the same result can be produced without an additional half-wave rotator as illustrated in FIG. 3.

A color switching apparatus 20' is physically identical to the apparatus 20 shown in FIG. 2, with like elements designated by the same reference numerals. However, elements which are operated in a modified manner from that of FIG. 2 are designated by the same reference numerals primed.

Figure 3:
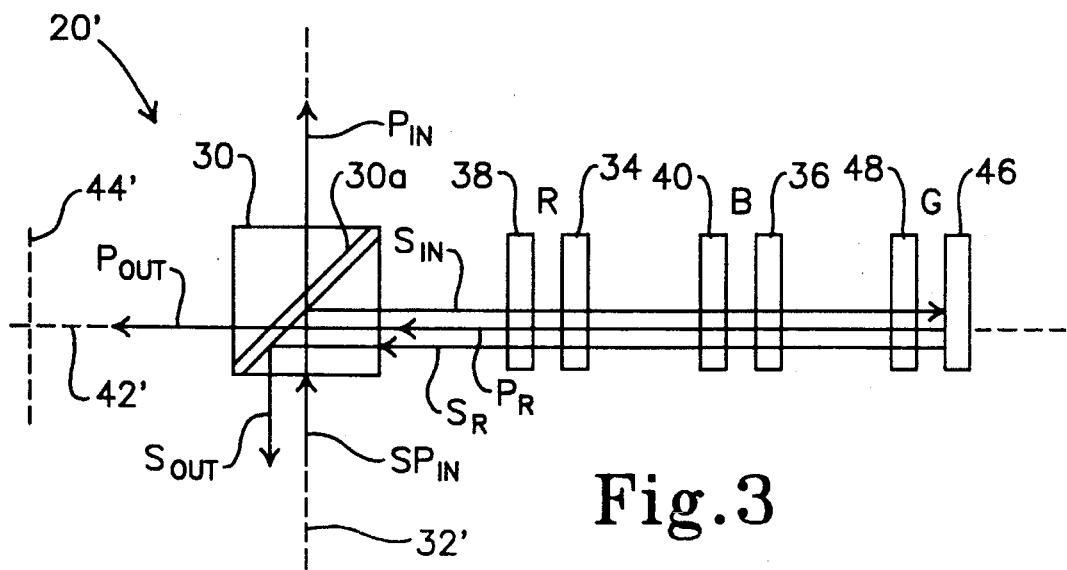

In FIG. 3, the input light beam $SP_{IN}$ is incident on the reflecting surface 30a in the upward direction, and the S component thereof $S_{IN}$ is reflected rightwardly to the reflectors 34, 36 and 46 and rotators 38, 40 and 48. To switch ON a color, the rotators 38, 40 and 48 are switched in accordance with TABLE 1 such that the corresponding color component reflected from the respective reflector 34, 36 and 46 makes an odd number of round-trip passes through the rotators 38, 40 and 48, is rotated to P polarization as indicated at $P_R$ and passes leftwardly through the cube 30 as the output beam $P_{OUT}$. Colors to be switched OFF are not rotated, or rotated by 180°, such that they have S polarization as indicated at $S_R$ and are reflected downwardly from the surface 30a as an unused beam $S_{OUT}$.

In FIG. 3, the input and output axes are reversed from their relative relationships in FIG. 2. The input axis is 32', the output axis is 42' and the output is 44'. The reflected S polarization is used as the input beam, the non-reflected P polarization is used as the output beam, also reversed from FIG. 2.

Figure 4:
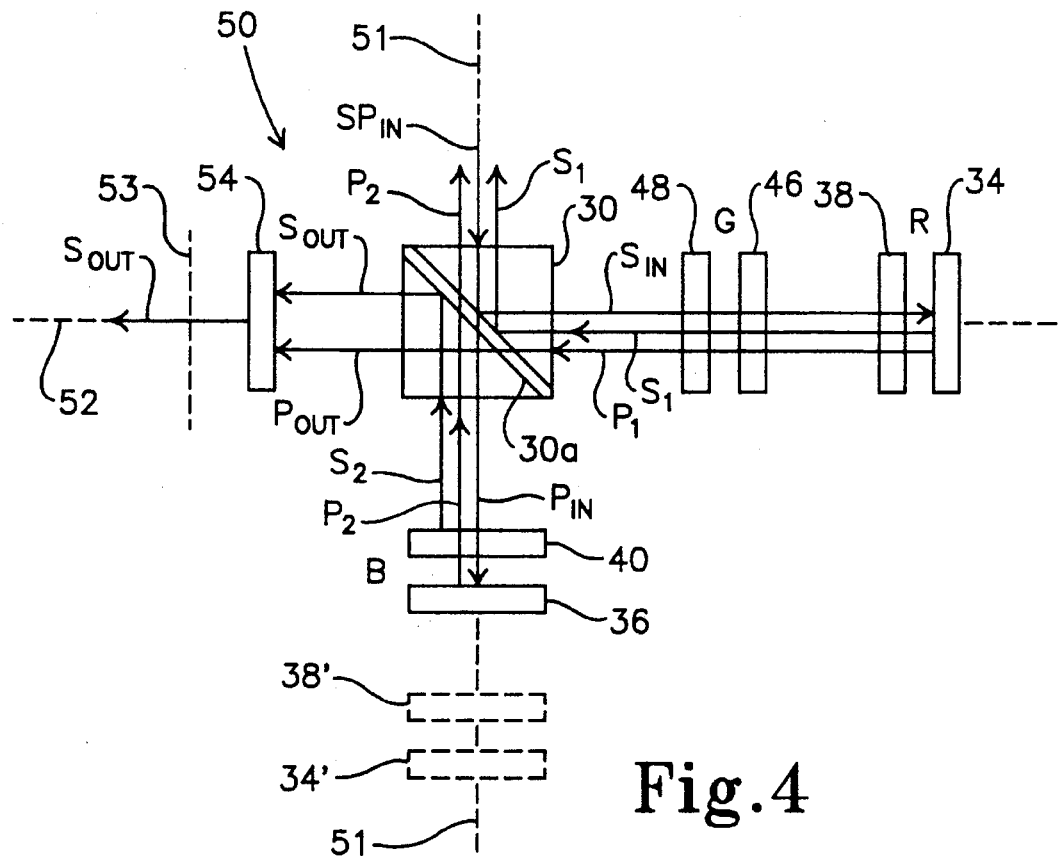

Whereas the embodiments of FIGS. 2 and 3 utilize only one input polarization state, the embodiment of FIG. 4 utilizes both S and P input polarization states. Elements providing the same function are again designated by the same reference numerals used in FIGS. 2 and 3, although their locations in the apparatus may be different.

The color switching apparatus illustrated in FIG. 4 is generally designated as 50. The input white light beam $SP_{IN}$ is incident on the cube 30 in the downward direction along an input axis 51. The S polarized portion or component $S_{IN}$ of the input beam $SP_{IN}$ is reflected rightwardly by the reflecting surface 30a to the green rotator 48 and reflector 46 and the red rotator 38 and reflector 34 as shown. The P polarized portion or component $P_{IN}$ passes downwardly through the cube 30 to the blue rotator 40 and reflector 36. The rotators 38, 40 and 48 are all switchable between a first state which provides quarter-wave polarization and a second state which provides zero polarization rotation.

To switch ON the red color, the rotator 38 is switched ON and the rotators 40 and 48 are switched OFF. The red color light beam reflected from the reflector 34 is rotated from S to P polarization by a round-trip pass through the rotator 38 as indicated at $P_1$ and passes leftwardly through the cube 30 along an output axis 52 to an output 53 as an output light beam $P_{OUT}$. The green light beam reflected from the reflector 46 is not rotated as indicated at $S_1$, and is reflected upwardly from the surface 30a out of the cube 30. The blue light beam reflected from the reflector 36 is not rotated as indicated at $P_2$, and passes upwardly out through the cube 30.

To switch ON the green color, the rotators 38 and 48 are switched ON, and the rotator 40 is switched OFF. The green light beam reflected from the reflector 48 is rotated to P polarization by the rotator 48 as indicated at $P_1$, and passes through the cube 30 to the output 53 as $P_{OUT}$. The red light beam reflected from the reflector 34 is rotated 180° by the rotators 38 and 48 as indicated at $S_1$, and reflected upwardly out of the cube 30. The blue light beam reflected from the reflector 36 is not rotated as indicated at $P_2$, and passes upwardly out through the cube 30.

To switch ON the blue color, the rotator 40 is switched ON and the rotators 38 and 48 are switched OFF. The blue light beam reflected from the reflector 36 is rotated 90° by the rotator 40 as indicated at $S_2$, and reflected leftwardly by the surface 30a to constitute an output light beam $S_{OUT}$. The red and green reflected light beams are not rotated as indicated at $S_1$, and reflected upwardly out of the cube 30.

The rotators 38, 40 and 48 as illustrated in FIG. 4 may also be switched to select combinations of colors in accordance with truth TABLE 2.

TABLE 2

| COLOR | ROTATOR | | |
|---|---|---|---|
| | 38 | 40 | 48 |
| R | ON | OFF | OFF |
| B | OFF | ON | OFF |
| G | ON | OFF | ON |
| ALL OFF | OFF | OFF | OFF |
| ALL ON | OFF | ON | ON |
| R + B | ON | ON | OFF |
| R + G | OFF | OFF | ON |
| B + G | ON | ON | ON |

The apparatus 50 as described is advantageous in that it has high rejection of unselected colors. No color other than the selected one(s) is directed to the output 53. However, the blue color is output with S polarization whereas the red and green colors are output with P polarization. This is not a problem in an application where the polarization of the output beam is irrelevant. However, if only one color is to be selected at one time and the output beam must have a particular polarization, a polarization rotator 54 which is switchable between half-wave polarization rotation and zero polarization rotation may be provided between the cube 30 and the output 53. Assuming that the output beam is required to have S polarization, the rotator 54 will be switched OFF to select the blue color and switched ON to select the red and green colors. Where the output beam is required to have P polarization, the switching is reversed. The switching of the rotators 38, 40, 48 and 52, assuming S output polarization, is listed in the following truth TABLE 3.

TABLE 3

| COLOR | ROTATOR | | | |
|---|---|---|---|---|
| | 38 | 40 | 48 | 52 |
| R | ON | OFF | OFF | ON |
| B | OFF | ON | OFF | OFF |
| G | ON | OFF | ON | ON |

Whereas the reflectors and rotators for the red and green colors are illustrated in FIG. 4 as being aligned to receive the reflected S polarized portion of the input light beam $S_{IN}$ from the cube 30, and the reflector and rotator for the blue color are disposed to receive the transmitted P polarized portion $P_{IN}$, the arrangement may be reversed within the scope of the invention. As illustrated in broken line, the reflector and rotator for the red color may, for example, be relocated below the reflector 36 and rotator 40 for the blue color as indicated at 34' and 38' respectively to receive the transmitted P portion $P_{IN}$ of the input beam. Of course, the arrangement of the colors is arbitrary, and can have any desired configuration.

The apparatus 50 may also be configured to operate with only two of the polarization rotators being switchable, more specifically the rotators 48 and 54. In this case, the rotators 38 and 40 provide constant quarter-wave polarization rotation. The colors are selected in accordance with the following truth TABLE 4.

TABLE 4

| COLOR | ROTATOR | |
|---|---|---|
| | 48 | 54 |
| R | OFF | ON |
| G | ON | ON |
| B | ON or OFF | OFF |

Where only the rotators 48 and 54 are switchable, the rotator 48 selects between the red and green colors, whereas the rotator 54 selects between the blue color and the red/green colors. Two color beams with S and P polarizations respectively will be present at the output 53, with the selected color beam having the desired polarization (S polarization as shown) and the other color beam having the other polarization (P polarization).

Figure 5:
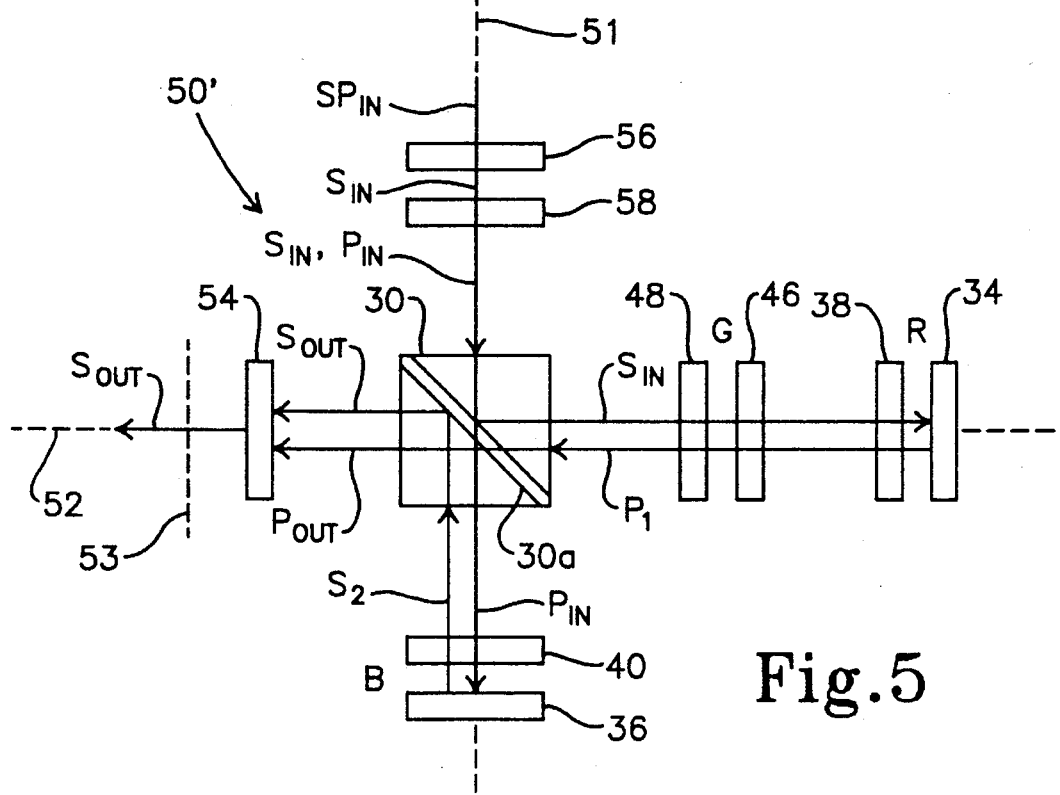

The presence of a color light beam of the unused polarization in the output beam may be unacceptable in some applications. The unused light beam can be eliminated and the rejection of unselected colors increased as illustrated in FIG. 5 In a modified color switching apparatus 50', the rotators 38 and 40 provide constant quarter-wave polarization, whereas the rotators 48 and 54 are switchable as in the apparatus 50. A linear polarizer or beam combiner 56 is provided to receive the unpolarized input beam $SP_{IN}$ and pass only S polarized light therethrough as an input beam $S_{IN}$. A switchable half-wave polarization rotator 58 is provided below the polarizer 56 to selectably rotate or not rotate the polarization of the beam $S_{IN}$.

The rotator 58 is switched ON to select the blue color and switched OFF to select the red/green colors. When the rotator 58 is switched ON, the beam $S_{IN}$ is rotated to P polarization and passes through the cube 30 to the blue reflector 36 and rotator 40. When the rotator 58 is switched OFF, the beam $S_{IN}$ is reflected by the surface 30a to the red and green reflectors 34 and 46 and rotators 38 and 48 respectively. The switching of the colors is performed in accordance with the following truth TABLE 5.

TABLE 5

| COLOR | ROTATOR | | |
|---|---|---|---|
| | 48 | 54 | 58 |
| R | OFF | ON | OFF |
| B | ON or OFF | OFF | ON |
| G | ON | ON | OFF |

In the embodiments of FIGS. 2 to 5, the output axis is illustrated as being angularly displaced from the input axis by 90°. However, the displacement angle may differ from 90° within the scope of the invention.

Figure 6:
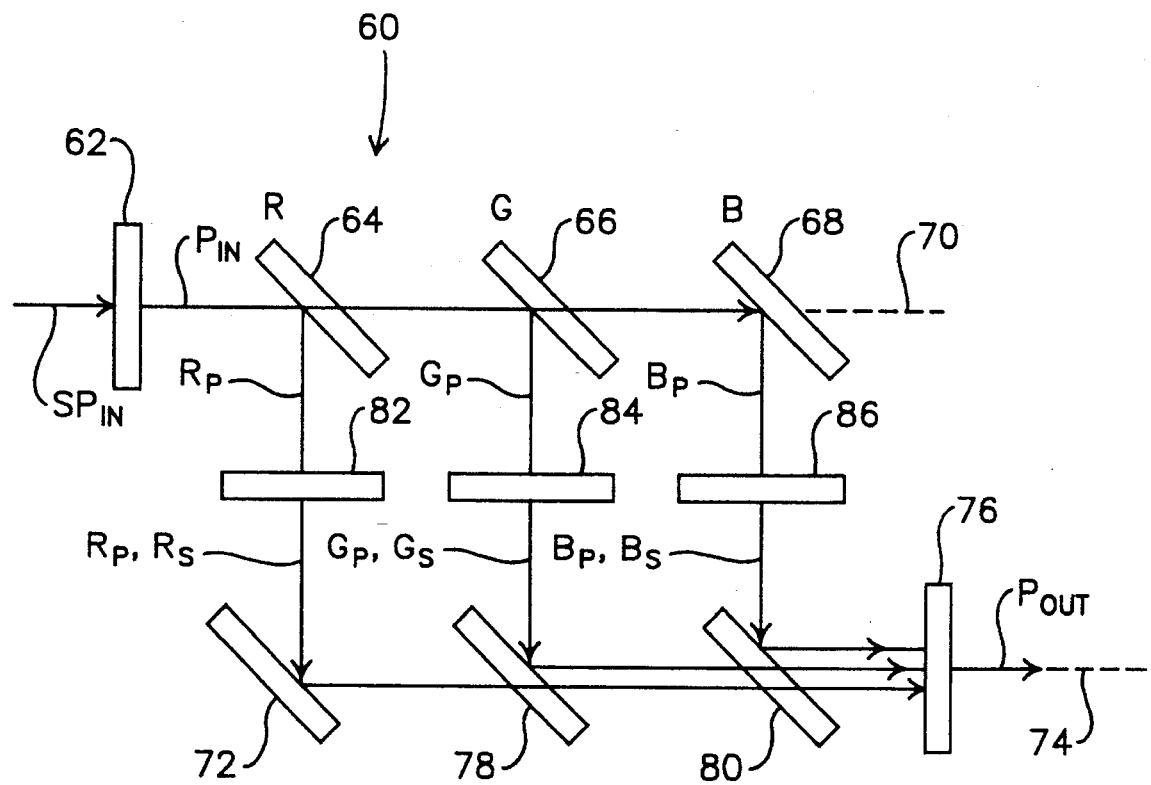

Another color switching apparatus embodying the present invention is illustrated in FIG. 6 and designated as 60. An unpolarized input white light beam $SP_{IN}$ is passed through a linear polarizer or beam combiner 62 which transmits a linear P polarized light beam $P_{IN}$ therethrough. The beam $P_{IN}$ is directed to reflectors 64, 66 and 68 along an input axis 70. The reflector 64 reflects a red light beam $R_P$ downwardly to a reflector 72, which reflects this beam along an output axis 74 to a linear polarizer 76 which passes only linear P polarized light therethrough.

The reflector 64 transmits green and blue light therethrough. The reflector 66 reflects a green light beam $G_P$ to a reflector 78 which reflects this beam along the output axis 74 to the polarizer 76. The reflector 66 transmits blue light, which is reflected by the reflector 68 to a reflector 80, which reflects this beam along the output axis 74 to the polarizer 76.

It will be noted that the reflector pairs 64,72, 66,78 and 68,80 are used to separate the input white light beam $P_{IN}$ into light beams of the respective red, green and blue colors. One reflector of each pair may selectively reflect light of the respective color, whereas the other reflector may reflect light of all three colors if desired.

Switchable half-wave polarization rotators 82, 84 and 86 are disposed between the individual reflectors of the pairs 64,72, 66,78 and 68,80 respectively. When the rotator 82, 84 and/or 86 is switched OFF, the respective P polarized color light beam $R_P$, $G_P$ or $B_P$ is reflected to the polarizer 76 and passes therethrough as an output beam $P_{OUT}$. When the rotator 82, 84 and/or 86 is switched ON, the respective P polarized color light beam $R_P$, $G_P$ or $B_P$ is rotated to S polarization as indicated at $R_S$, $G_S$ and $B_S$ and reflected to the polarizer 76, but is prevented from passing therethrough. This enables any color combination of red, green, blue, or no color to be selected. Where the output beam is required to have S polarization, the input light beam can be S polarized, the switching of the rotators 82, 84 and 86 can be reversed, or the polarization of the output beam can be rotated by 90°.

As illustrated in FIG. 6, the input and output axes 70 and 74 are parallel. However, they can be angularly, as well as laterally displaced within the scope of the invention.

Figure 7:
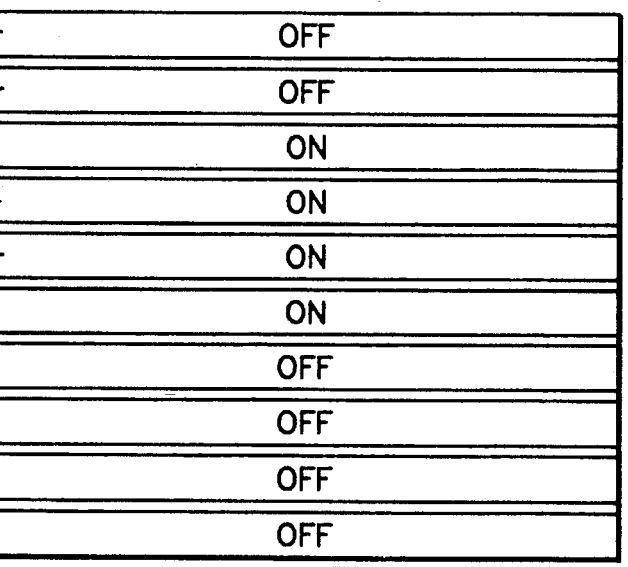
FIG. 7 is a diagrammatic plan view illustrating a modified polarization rotator of the switching apparatus.

FIG. 7 illustrates a switchable polarization rotator 90 which can replace any of the rotators described above. The rotator 90 includes individual segments 90a which are aligned perpendicular to the direction of propagation of light through the rotator 90. The segments 90a can be individually switched ON and OFF to produce a moving window effect. As shown, the four of the upper segments 90a are switched ON, whereas the remaining segments 90a are switched OFF. The ON segments 90a constitute an open window which can be moved up or down by individually switching the segments 90a the between the ON and OFF states.

While several illustrative embodiments of the invention have been shown and described, numerous variations and alternate embodiments will occur to those skilled in the art, without departing from the spirit and scope of the invention. For example, the polarization rotators can be switched partially to provide a mixture of colors. Also, the rotators can be switched gradually to provide a transition from monochrome to color. Accordingly, it is intended that the present invention not be limited solely to the specifically described illustrative embodiments. Various modifications are contemplated and can be made without departing from the spirit and scope of the invention as defined by the appended claims.

I claim:

1. A color switching apparatus for receiving an input light beam which includes light of first, second and third colors along an input axis and producing, in response thereto, an output light beam at an output which selectably includes light of a selected one, a selected two, or all three of the first color, the second color, and the third color, comprising:

first color separator means for producing, in response to the input light beam, a first color light beam including only light of the first color;

second color separator means for producing, in response to the input light beam, a second color light beam including only light of the second color;

third color separator means for producing, in response to the input light beam, a third color light beam including only light of the third color, beam director means for directing the first, second and third color light beams along an output axis which is displaced from the input axis toward the output; and circular polarization control means for selectively switching the polarizations of the first, second and third color light beams between linear and circular polarizations such that a selected one, a selected two, or all three of said first, second and third color light beams are directed to the output with a predetermined linear polarization state to constitute the output light beam.

2. An apparatus as in claim 1, in which the beam director means comprises a polarizing beam splitter for receiving the input light beam along the input axis, directing the input light beam to the first, second and third color separator means, receiving the first, second and third color light beams from the first, second and third color separator means and directing the first, second and third color light beams along the output axis to the output.

3. An apparatus as in claim 2, in which the first second and third color separator means are aligned with each other along the input axis.

4. An apparatus as in claim 3, in which:

the beam splitter includes a reflecting surface having a normal direction which is angularly displaced from the output axis; and said polarization state is perpendicular to the reflecting surface.

5. An apparatus as in claim 2, in which the first second and third color separator means are aligned with each other along the output axis.

6. An apparatus as in claim 5, in which:

the beam splitter includes a reflecting surface having a normal direction which is angularly displaced from the output axis; and said polarization state is parallel to the reflecting surface.

7. An apparatus as in claim 2, in which:

the first color separator means is disposed between the second color separator means and the beam splitter and includes a first reflector which reflects light of the first color and transmits light of the second color;

the second color separator means includes a second reflector which reflects light of the second color and does not reflect light of the first color; and the polarization control means comprises a first polarization rotator disposed between the first reflector and the beam splitter, and a second polarization rotator disposed between second reflector and the first color separator means.

8. An apparatus as in claim 7, in which the first rotator is switchable between a first state which provides substantially quarter-wave polarization rotation, and a second state which provides substantially zero polarization rotation; and the second rotator provides substantially quarter-wave polarization rotation.

9. An apparatus as in claim 7, in which the first and second rotators are each switchable between a first state which provides substantially quarter-wave polarization rotation, and a second state which provides substantially zero polarization rotation.

10. An apparatus as in claim 2, further comprising third color separator means, in which:

the input light beam further initially includes light of a third color;

the first color separator means includes a first reflector which reflects light of the first color and transmits light of the second and third colors;

the second color separator means is disposed between the first color separator means and the third color separator means and includes a second reflector which reflects light of the second color, does not reflect light of the first color and transmits light of the third color;

the third color separator means includes a third reflector which reflects light of the third color and does not reflect light of the first and second colors; and the polarization control means further includes a first polarization rotator disposed between the first reflector and the beam splitter, a second polarization rotator disposed between the second reflector and the first color separator means and a third polarization rotator disposed between the third reflector and the second polarization means.

11. An apparatus as in claim 10, in which the first, second and third rotators are each switchable between a first state which provides substantially quarter-wave polarization rotation, and a second state which provides substantially zero polarization rotation.

12. An apparatus as in claim 1, in which:

the beam director means comprises a polarizing beam splitter including a reflecting surface having a normal direction which is angularly displaced from the output axis;

the input light beam is incident on the reflecting surface along the input axis;

the first color separator means is disposed to receive a first portion of the input light beam which passes through the reflecting surface along the input axis;

the second color separator means is disposed to receive a second portion of the input light beam which is reflected from the reflecting surface along the output axis; and the third color separator means is disposed to receive a third portion of the input light beam which is reflected from the reflecting surface along the output axis.

13. A color switching apparatus for receiving an input light beam which includes light of first and second colors along an input axis and producing, in response thereto, an output light beam at an output which selectably includes light of the first color, the second color, or both the first and second colors, comprising:

first color separator means for producing, in response to the input light beam, a first color light beam including only light of the first color, wherein the input light beam is incident on the reflecting surface along the input axis, and wherein the first color separator means is disposed to receive a first portion of the input light beam which passes through the reflecting surface along the input axis the first color separator means is disposed to direct the first color light beam to the reflecting surface along the input axis;

second color separator means for producing, in response to the input light beam, a second color light beam including only light of the second color, wherein the second color separator means is disposed to receive a second portion of the input light beam which is reflected from the reflecting surface along the output axis the second color separator means is disposed to direct the second color light beam to the reflecting surface along the output axis;

the reflecting surface is disposed to reflect the first color light beam along the output axis toward the output;

the reflecting surface is further disposed to pass the second color light beam there through along the output axis toward the output;

beam director means for directing the first and second color light beams along an output axis which is displaced from the input axis toward the output, the beam director means further comprises a polarizing beam splitter including a reflecting surface having a normal direction which is angularly displaced from the output axis; and polarization control means for controlling the polarization of the first and second color light beams such that a select one or both thereof corresponding to said selected light of the first color, the second color, or both the first and second colors are directed to the output with a predetermined polarization state to constitute the output light beam.

14. An apparatus as in claim 13, in which:

the first color separator means comprises a first reflector which reflects light of the first color and does not reflect light of the second color; and the second color separator means comprises a second reflector which reflects light of the second color and does not reflect light of the first color.

15. An apparatus as in claim 14, in which:

the polarization control means comprises a first polarization rotator disposed between the first reflector and the reflecting surface, and a second polarization rotator disposed between the second reflector and the reflecting surface; and the first and second rotators are each switchable between a first state which provides substantially quarter-wave polarization rotation, and a second state which provides substantially zero polarization rotation.

16. An apparatus as in claim 14, in which the polarization control means comprises:

a first polarization rotator which provides substantially quarter-wave polarization rotation and is disposed between the first reflector and the reflecting surface;

a second polarization rotator which provides substantially quarter-wave polarization rotation and is disposed between the second reflector and the reflecting surface; and a third polarization rotator which is switchable between a first state which provides substantially half-wave polarization rotation and a second state which provides substantially zero polarization rotation, and is disposed between the reflecting surface and the output.

17. An apparatus as in claim 16, further comprising third color separator means disposed between the first color separator means and the reflecting surface, in which:

the input light beam further initially includes light of a third color;

the third color separator means includes a third reflector which reflects light of the third color, does not reflect light of the second color and transmits light of the first color; and the polarization control means further includes a fourth polarization rotator which is switchable between a first state which provides substantially quarter-wave polarization rotation and a second state which provides substantially zero polarization rotation, and is disposed between the third reflector and the reflecting surface.

18. An apparatus as in claim 16, further comprising third color separator means disposed between the second color separator means and the reflecting surface, in which:

the input light beam further initially includes light of a third color;

the third color separator means includes a third reflector which reflects light of the third color, does not reflect light of the first color and transmits light of the second color; and the polarization control means further includes a fourth polarization rotator which is switchable between a first state which provides substantially quarter-wave polarization rotation and a second state which provides substantially zero polarization rotation, and is disposed between the third reflector and the reflecting surface.

19. An apparatus as in claim 1, in which:

the first color separator means comprises a first reflector which receives the input light beam along the input axis, reflects light of the first color and transmits light of the second color;

the second color separator means comprises a second reflector which receives the input light beam along the input axis after passage thereof through the first reflector and reflects light of the second color;

the beam director means comprises:

a third reflector which reflects light from the first reflector along the output axis to the output, the first and third reflectors in combination reflecting light of the first color and not reflecting light of the second color; and a fourth reflector which transmits light of the first color from the first reflector and reflects light from the second reflector along the output axis to the output, the second and fourth reflectors in combination reflecting light of the second color and not reflecting light of the first color; and the polarization control means comprises:

a first polarization rotator which is switchable between a first state which provides substantially half-wave polarization rotation and a second state which provides substantially zero polarization rotation, and is disposed to control the polarization of light reflected from the first reflector; and a second polarization rotator which is switchable between a first state which provides substantially half-wave polarization rotation and a second state which provides substantially zero polarization rotation, and is disposed to control the polarization of light reflected from the second reflector.

20. An apparatus as in claim 19, in which:

the first rotator is disposed between the first and third reflectors; and the second rotator is disposed between the second and fourth rotators.

21. An apparatus as in claim 19, in which the output axis is parallel to the input axis.

22. An apparatus as in claim 1, in which:

the polarization control means comprises a polarization rotator which is disposed such the at least one of the first and second color light beams passes therethrough along a predetermined axis; and the polarization rotator comprises a plurality of segments which are aligned with each other perpendicular to said predetermined axis, each segment being individually switchable between a first state which provides a first predetermined polarization rotation, and a second state which provides a second predetermined polarization rotation.

23. In a liquid crystal light valve projector including a liquid crystal light valve and a light source for producing a substantially white light beam, a color switching apparatus for receiving the white light beam from the light source along an input axis and producing, in response thereto, an output light beam which selectably includes light of at least first, second or third primary colors or combination thereof at an output for illuminating the light valve, comprising:

first color separator means for producing, in response to the input light beam, a first color light beam including only light of the first primary color;

second color separator means for producing, in response to the input light beam, a second color light beam including only light of the second primary color;

third color separator means for producing, in response to the input light beam, a third color light beam including only light of the third primary color;

beam director means for directing the first, second and third color light beams along an output axis which is displaced from the input axis toward the output; and circular polarization control means for selectively switching the polarizations of the first, second and third color light beams between linear and circular polarizations such that a selected one, a selected two, or all three of the first, second or third primary colors are directed to the output with a predetermined polarization state to constitute the output light beam.

24. A projector as in claim 23, in which the beam director means comprises a polarizing beam splitter for receiving the input light beam along the input axis, directing the input light beam to the first, second and third color separator means, receiving the first, second and third color light beams from the first, second and third color separator means and directing the first, second and third color light beams along the output axis to the output.

25. A projector as in claim 24, in which the first, second and third color separator means are aligned with each other along the input axis.

26. A projector as in claim 24, in which the first, second and third color separator means are aligned with each other along the output axis.

27. A projector as in claim 24, in which:

the first color separator means includes a first reflector which reflects light of the first color and transmits light of the second and third colors;

the second color separator means is disposed between the first color separator means and the third color separator means and includes a second reflector which reflects light of the second color, does not reflect light of the first color and transmits light of the third color;

the third color separator means includes a third reflector which reflects light of the third color and does not reflect light of the first and second colors; and the polarization control means includes a first polarization rotator disposed between the first reflector and the beam splitter, a second polarization rotator disposed between the second reflector and the first color separator means and a third polarization rotator disposed between the third reflector and the second polarization means.

28. A projector as in claim 24, in which:

the beam director means comprises a polarizing beam splitter including a reflecting surface having a normal direction which is angularly displaced from the output axis;

the input light beam is incident on the reflecting surface along the input axis;

the first color separator means is disposed to receive a first portion of the input light beam which passes through the reflecting surface along the input axis;

the second color separator means is disposed to receive a second portion of the input light beam which is reflected from the reflecting surface along the output axis; and the third color separator means is disposed between the first color separator means and the reflecting surface to receive the first portion of the input beam.

29. In a liquid crystal light valve projector including a liquid crystal light valve and a light source for producing a substantially white input light beam, a color switching apparatus for receiving the white light beam from the light source along an input axis and producing, in response thereto, an output light beam which selectably includes light of a first, second or third primary color or combination thereof at an output for illuminating the light valve, comprising:

first color separator means for producing, in response to the input light beam wherein the input light beam is incident on the reflecting surface long the input axis, a first color light beam including only light of the first primary color wherein the first color separator means is disposed to receive a first portion of the input light beam which passes through the reflecting surface along the input axis and the first color separator means comprises a first reflector which reflects light of the first color and does not reflect light of the second and third colors;

second color separator means for producing, in response to the input light beam, a scone color light beam including only light of the second primary color wherein the second color separator means is disposed to receive a second portion of the input light beam which is reflected from the reflecting surface along the output axis and the second color separator means comprises a second reflector which reflects light of the second color and does not reflect light of the first and third colors;

third color separator mean for producing, in response to the input light beam, a third color light beam including only light of the third primary color wherein the third color separator means is disposed between the first color separator means and the reflecting surface to receive the first portion of the input beam and the third color separator means includes a third reflector which reflects light of the third color, does not reflect light of the second color and transmits light of the first color;

beam director means for directing the first, second and third color light beams along an output axis which is displaced from the input axis toward the output wherein the beam director means further comprises a polarizing beam splitter for receiving the input light beam along the input axis, directing the input light beam to the first, second and third color separator means, receiving the first, second and third color light beams from the first, second and third color separator means and directing the first, second and third color light beams along the output axis to the output and the beam director means comprises a polarizing beam splitter including a reflecting surface having a normal direction which is angularly displaced from the output axis; and polarization control means for controlling the polarization of the first, second and third color light beams such that a selected one or combination thereof corresponding to said selected light of the first, second or third primary color or combination thereof is directed to the output with a predetermined polarization state to constitute the output light beam wherein the polarization control means comprises:
a first polarization rotator disposed between the first reflector and the third color separator means;
a second polarization rotator dispose between the second reflector and the reflecting surface; and
a third polarization rotator disposed between the third reflector and the reflecting surface.

30. A projector as in claim 29, in which:
the first and second rotators provide substantially quarter-wave polarization rotation;
the third rotator is switchable between a first state which provides substantially quarter-wave polarization and a second state which provides substantially zero polarization rotation; and
the polarization control means further comprises a fourth polarization rotator which is switchable between a first state which provides substantially half-wave polarization rotation and a second state which provides substantially zero polarization rotation, and is disposed between the reflecting surface and the output.

31. In a liquid crystal light valve projector including a liquid crystal light valve and a light source for producing a substantially white input light beam, a color switching apparatus for receiving the white input light beam from the light source along an input axis and producing, in response thereto, an output light beam which selectably includes light of a first, second or third primary color or combination thereof at an output for illuminating the light valve, comprising:
first color separator means for producing, in response to the input light beam, the input light beam is incident on the reflecting surface along the input axis a first color light beam including only light of the first primary color the first color separator means is disposed to receive a first portion of the input light beam which passes through the reflecting surface along the input axis;
second color separator means for producing, in response to the input light beam, a second color light beam including only light of the second primary color the second color separator means is disposed to receive a second portion of the input light beam which is reflected form the reflecting surface along the output axis;
third color separator mean for producing, in response to the input light beam, a third color light beam including only light of the third primary color the third color separator means is disposed between the second color separator means and the reflecting surface to receive the second portion of the input beam;
beam director means for directing the first, second and third color light beams along an output axis which is displaced from the input axis toward the output wherein the beam director means comprises a polarizing beam splitter for receiving the input light beam along the input axis, directing the input light beam to the first, second and third color separator means, receiving the first, second and third color light beams from the first, second and third color separator means and directing the first, second and third color light beams along the output axis to the output the beam director means comprises a polarizing beam splitter including a reflecting surface having a normal direction which is angularly displaced from the output axis; and
polarization control means for controlling the polarization of the first, second and third color light beams such that a selected on or combination thereof corresponding to said selected light of the first, second or third primary color or combination thereof is directed to the output wit a predetermined polarization state to constitute the output light beam.

32. A projector as in claim 31, in which:
the first color separator means comprises a first reflector which reflects light of the first color and does not reflect light of the second and third colors;
the second color separator means comprises a second reflector which reflects light of the second color and does not reflect light of the first and third colors;
the third color separator means includes a third reflector which reflects light of the third color, does not reflect light of the first color and transmits light of the second color; and
the polarization control means comprises:
a first polarization rotator disposed between the first reflector and the reflecting surface;
a second polarization rotator disposed between the second reflector and the third color separator means; and
a third polarization rotator disposed between the third reflector and the reflecting surface.

33. A projector as in claim 32, in which:
the first and second rotators provide substantially quarter-wave polarization rotation;
the third rotator is switchable between a first state which provides substantially quarter-wave polarization and a second state which provides substantially zero polarization rotation; and
the polarization control means further comprises a fourth polarization rotator which is switchable between a first state which provides substantially half-wave polarization rotation and a second state which provides substantially zero polarization rotation, and is disposed between the reflecting surface and the output.

34. A projector as in claim 23, in which:
the polarization control means comprises a polarization rotator which is disposed such at least one of the first, second and third color light beams passes therethrough along a predetermined axis; and
the polarization rotator comprises a plurality of segments which are aligned with each other perpendicular to said predetermined axis, each segment being individually switchable between a first state which provides a first predetermined polarization rotation, and a second state which provides a second predetermined polarization rotation.

35. In a liquid crystal light valve projector including a liquid crystal light valve, a polarization beam splitter, and a light source for providing light to said polarization beam splitter, a color switching apparatus for receiving light of a first linear polarization from said polarization beam splitter and for selectively providing light, having a first color and a second linear polarization, to said polarization beam splitter, said color switching apparatus comprising:
first polarization rotating means for receiving light from said polarizing beam splitter and having a first state in which light passes therethrough without a change in polarization and a second state in which light of said first linear polarization passing therethrough is rotated to a first circular polarization, light of said second linear polarization passing therethrough is rotated to a second circular polarization, light of said first circular polarization passing therethrough is rotated to said first linear polarization, and light of said second circular polarization passing therethrough is rotated to said second linear polarization;

first reflecting means, located adjacent said first polarization rotating means, for reflecting light of said first color and for rotating said light of said first color having said first circular polarization to said second circular polarization and said second circular polarization to said first circular polarization and for not rotating light of said first and second linear polarization;

control means, coupled to said first polarization rotating means, for controllably switching said first polarization rotating means between said first and second states to selectively provide light having said first color and said second linear polarization to said polarization beam splitter.

36. The color separating apparatus of claim 35 wherein said polarization beam splitter directs light from said light source having said first linear polarization onto said first polarization rotating means, and wherein, when said first polarization rotating means is in said second state, said first polarization rotating means transforms light of said first linear polarization to said first circular polarization.

37. The color separating apparatus of claim 36 wherein light of said first color and said first circular polarization is reflected by said first reflector towards said first polarization rotating means and is rotated to said second circular polarization.

38. The color separating apparatus of claim 37 wherein light of said first color and second circular polarization from said first reflector is rotated by said first polarization rotating means into light of said first color and said second linear polarization.

39. The color separating apparatus of claim 38 wherein light of said first color and said second linear polarization is directed by said polarization beam splitter to said liquid crystal light valve.

40. In a liquid crystal light valve projector including a liquid crystal light valve, a polarization beam splitter, and a light source for providing light to said polarization beam splitter, a color switching apparatus for receiving light of a first linear polarization from said polarization beam splitter and for selectively providing light, having a second linear polarization and a first color, a second color, or both said first and second colors, to said polarization beam splitter, said color switching apparatus comprising:

first and second polarization rotating means each for receiving light from said polarizing beam splitter and having a first state in which light passes therethrough without a change in polarization and a second optical state in which light of said first linear polarization passing therethrough is rotated to a first circular polarization, light of said second linear polarization passing therethrough is rotated to a second circular polarization, light of said first circular polarization passing therethrough is rotated to said first linear polarization and light of said second circular polarization passing therethrough is rotated to said second linear polarization;

first reflecting means, located adjacent said first polarization rotating means, for reflecting light of a first color and for rotating said light of said first color having said first circular polarization to said second circular polarization and said second circular polarization to said first circular polarization, and for not rotating light of said first and second linear polarization;

second reflecting means, located adjacent said second polarization rotating means, for reflecting light of a second color and for rotating said light of said second color having said first circular polarization to said second circular polarization and said second circular polarization to said first circular polarization, and for not rotating light of said first and second linear polarization;

control means, coupled to said first and second polarization rotating means, for controllably switching said first and second polarization rotating means between said first and second states to selectively provide light having said first color, said second color, or both said first and second colors and said second linear polarization to said polarization beam splitter.

* * * * *